US011950596B2

(12) United States Patent
Kim

(10) Patent No.: US 11,950,596 B2
(45) Date of Patent: Apr. 9, 2024

(54) METHODS OF PROTECTING SEEDS FROM OXIDANTS AND MICROORGANISMS

(71) Applicant: The United States of America, as represented by the Secretary of Agriculture, Washington, DC (US)

(72) Inventor: Jong Heon Kim, Albany, CA (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 232 days.

(21) Appl. No.: 17/513,192

(22) Filed: Oct. 28, 2021

(65) Prior Publication Data

US 2022/0159953 A1    May 26, 2022

Related U.S. Application Data

(60) Provisional application No. 63/117,672, filed on Nov. 24, 2020.

(51) Int. Cl.
| | | |
|---|---|---|
| *A01N 37/40* | (2006.01) | |
| *A01C 1/06* | (2006.01) | |
| *A01P 1/00* | (2006.01) | |
| *A01P 3/00* | (2006.01) | |

(52) U.S. Cl.
CPC ............... *A01N 37/40* (2013.01); *A01C 1/06* (2013.01); *A01P 1/00* (2021.08); *A01P 3/00* (2021.08)

(58) Field of Classification Search
None
See application file for complete search history.

(56) References Cited

PUBLICATIONS

Fujita et al., "Antifungal activity of octyl gallate", Int. J. Food Microbiology, 79 (2002), p. 193 201 (Year: 2002).*
Annous, B.A., and A. Burke, 2015, "Development of combined dry heat and chlorine dioxide gas treatment with mechanical mixing for inactivation of *Salmonella enterica* serovar Montevideo on mungbean seeds," J. Food Prot. 78 (5): 868-872.
Bowyer, P., and D.W. Denning, 2014, "Environmental fungicides and triazole resistance in Aspergillus," Pest Manag. Sci. 70: 173-178.
Cao, F., et al., Chemosphere, 2019, "Developmental toxicity of the fungicide ziram in zebrafish (*Danio rerio*)," 214: 303-313.
Chowdhary, A., et al., 2012, "Clonal Expansion and Emergence of Environmental Multiple-Triazole-Resistant Aspergillus fumigatus Strains Carrying the TR34/L98H Mutations in the cyp51A Gene in India" PLoS One. 7(12): e52871.

(Continued)

*Primary Examiner* — Bethany P Barham
*Assistant Examiner* — Barbara S Frazier
(74) *Attorney, Agent, or Firm* — John Fado; Maria Restrepo-Hartwig

(57) ABSTRACT

Disclosed are methods of protecting seeds from oxidants and microorganisms prior to planting said seed, involving coating the seeds with an antioxidant effective amount and an antimicrobial effective amount of a composition containing at least one compound selected from the group consisting of $C_{7-18}$ gallates in an optional solvent and/or optional carrier prior to planting the seeds, and heating the seeds to a temperature of about 20° C. to about 70° C. for about 5 minutes to about 60 minutes prior to planting the seeds.

6 Claims, 4 Drawing Sheets

(56) References Cited

PUBLICATIONS

Cui, N., et al., 2019, "Tebuconazole induces triazole-resistance in Aspergillus fumigatus in liquid medium and soil" Sci. Total Environ. 648: 1237-1243.
Dagnas, S., and J.M. Membre, 2013, "Predicting and preventing mold spoilage of food products," J. Food Prot. 76: 538-551.
Doukas, E.G., et al., 2012, "Effect of DMI-resistance mechanisms on cross-resistance patterns, fitness parameters and aflatoxin production in Aspergillus parasiticus Speare," Fungal Genet. 49 (10): 792-801.
Fisher, M.C., et al., 2018, "Worldwide emergence of resistance to antifungal drugs challenges human health and food security," Science 360(6390):739-742.
Gutierrez, J., et al., 2009, "Antimicrobial activity of plant essential oils using food model media: efficacy, synergistic potential and interactions with food components," Food Microbiol. 26: 142-150.
Han, S.H. et al., 2020, "Effects of Azole Fungicides on Secreted Metabolomes of Botrytis cinerea," J. Agric. Food Chem., 68:5309-5317.
Hansen, J.D., and J.A. Johnson, 2011, "History and use of heat in pest control: a review," Int. J. Pest. Manag. 57(4): 267-289.
Hawkins, L.K., et al., 2005, "Effect of different postharvest drying temperatures on Aspergillus flavus survival and aflatoxin content in five maize hybrids," J. Food Prot. 68: 1521-1524.
Holloway, A.C., et al., 2015, "Heat treatment enhances the antimicrobial activity of (+)-Catechin when combined with copper sulphate," Lett. Appl. Microbiol. 61: 381-389.
Jacob, C., 2006, "A scent of therapy: pharmacological implications of natural products containing redox-active sulfur atoms," Nat. Prod. Rep. 23: 851-863.
Jacob, C., 2014, "Redox active natural products and their interaction with cellular signalling pathways," Molecules 19: 19588-19593.
Kim, J.H. et al., 2007, "Enhancement of fludioxonil fungicidal activity by disrupting cellular glutathione homeostasis with 2,5-dihydroxybenzoic acid," FEMS Microbiol Lett. 270(2): 284-290.
Kim, J.H. et al., 2011, "Antifungal activity of redox-active benzaldehydes that target cellular antioxidation," Ann. Clin. Microbiol. Antimicrob. 10, Article 23.
Kim, J.H. et al., 2013, "Synergism of antifungal activity between mitochondrial respiration inhibitors and kojic acid," Molecules 18 (2): 1564-1581.
Kim, N.H., et al., 2015, "Optimization of low-temperature blanching combined with calcium treatment to inactivate Escherichia coli O157:H7 on fresh-cut spinach," J. Appl. Microbiol. 119: 139-148.
Kitagawa, E., et al., 2002, "Effects of the pesticide thiuram: genome-wide screening of indicator genes by yeast DNA microarray," Environ. Sci. Technol., 36 (18): 3908-3915.
Kurek, K., et al., 2019, "Reactive oxygen species as potential drivers of the seed aging process," Plants (Basel), 8(6): 174; https://doi.org/10.3390/plants8060174.
Kumar, S.P.J., et al., 2015, "Seed birth to death: dual functions of reactive oxygen species in seed physiology," Ann. Bot. 116: 663-668.
Li, HX and Xiao CL., 2008, "Characterization of fludioxonil-resistant and pyrimethanil-resistant phenotypes of Penicillium expansum from apple," Phytopathology 98:427-435.
Leistner, L., 2000, "Basic aspects of food preservation by hurdle technology," Int. J. Food Microbiol. 55: 181-186.
Liato, V., et al., 2015, "Study of the combined effect of electro-activated solutions and heat treatment on the destruction of spores of Clostridium sporogenes and Geobacillus stearothermophilus in model solution and vegetable puree," Anaerobe. 35(Pt B): 11-21.
Luo, K., and D.H. Oh, 2016, "Inactivation kinetics of Listeria monocytogenes and *Salmonella enterica* serovar Typhimurium on fresh-cut bell pepper treated with slightly acidic electrolyzed water combined with ultrasound and mild heat," Food Microbiol., 53(Pt B): 165-171—doi: 10.1016/j.fm.2015.09.014.
Macedo, W.R., et al., 2018, "Physiologic and metabolic effects of exogenous kojic acid and tyrosol, chemicals produced by endophytic fungus, on wheat seeds germination," Nat. Prod. Res. 32 (22): 2692-2696.
Peng, J., et al., 2017, "Thermal pasteurization of ready-to-eat foods and vegetables: Critical factors for process design and effects on quality," Crit. Rev. Food Sci. Nutr. 57(14): 2970-2995.
Pócsi, I., et al., 2004, "Glutathione, altruistic metabolite in fungi," Adv. Microb. Physiol., 49: 1-76.
Popiel, D. et al., 2017, "Multiple facets of response to fungicides—the influence of azole treatment on expression of key mycotoxin biosynthetic genes and candidate resistance factors in the control of resistant Fusarium strains," Eur. J. Plant Pathol. 147:773-785.
Prigitano, A., et al., 2019, "Azole-resistant Aspergillus fumigatus in the Italian environment," J. Glob. Antimicrob. Resist. 16: 220-224.
Ratajczak, E., et al., 2015, "The production, localization and spreading of reactive oxygen species contributes to the low vitality of long-term stored common beech (*Fagus sylvatica* L.) seeds," J. Plant Physiol. 174:147-156.
Riat, A., et al., 2018, "Azole Resistance of Environmental and Clinical Aspergillus fumigatus Isolates from Switzerland," Antimicrob. Agents Chemother. 62(4): e02088-17.
Rivero-Menendez, O .t al., 2016, "Triazole Resistance in *Aspergillus* spp.: A Worldwide Problem?," J. Fungus 2 (3): 21, DOI:10.3390/jof2030021.
Ros-Chumillas, M., et al., 2015, "Effect of Nisin and Thermal Treatments on the Heat Resistance of Clostridium sporogenes Spores," J. Food Prot. 78 (11): 2019-2023.
Rudramurthy, S.M., et al., 2019, "Invasive Aspergillosis by Aspergillus flavus: Epidemiology, Diagnosis, Antifungal Resistance, and Management," J. Fungus 5: 55 DOI:10.3390/jof5030055.
Sharma, C., et al., 2015, "Triazole-resistant Aspergillus fumigatus harbouring G54 mutation: Is it de novo or environmentally acquired?," J. Glob. Antimicrob. Resist. 3 (2): 69-74.
Tangwattanachuleeporn, M., et al., 2017, "Prevalence of azole-resistant Aspergillus fumigatus in the environment of Thailand," Med. Mycol. 55 (4): 429-435.
Tilton, F., et al., 2006, "Dithiocarbamates have a common toxic effect on zebrafish body axis formation," Toxicol. Appl. Pharmacol. 216: 55-68.
Xu, X., et al., 2017, "Human arylamine N-acetyltransferase 1 is inhibited by the dithiocarbamate pesticide thiram," Mol. Pharmacol. 92: 358-365.

\* cited by examiner

METHODS OF PROTECTING SEEDS FROM OXIDANTS AND MICROORGANISMS

This application claims the benefit of U.S. Provisional Application No. 63/117,672, filed 24 Nov. 2020, which is incorporated herein by reference in its entirety.

BACKGROUND OF THE INVENTION

Disclosed are methods of protecting seeds simultaneously from oxidants and microorganisms prior to planting the seeds, involving coating the seeds with an antioxidant effective amount and an antimicrobial effective amount of a composition containing at least one compound selected from the group consisting of $C_{7-18}$ gallates in an optional solvent and/or optional carrier prior to planting the seeds, and subsequently heating the seeds to a temperature of about 20° C. to about 70° C. for about 5 minutes to about 60 minutes prior to planting the seeds.

Seed treatment is a crop protection strategy which enables healthy crop establishment in the fields via better seed preservation, germination, growth promotion, and crop protection against a wide variety of abiotic or biotic stressors. Compared to other protection strategies, such as foliar/furrow spraying during crop season, seed treatment can achieve a low-cost crop protection since the treatment requires a relatively small amount of active ingredients, allows for disease control, and prevents contamination of carcinogenic mycotoxins at the earlier stage of crop growth, and lowers resistance transmission. The development of novel seed-treatment products that can be applied as alternatives to the conventional, toxic chemical compositions will also facilitate sustainable crop management.

The viability of crop seeds is greatly affected by 'abiotic' and 'biotic' stresses, for which the generation of reactive oxygen species (ROS) is the contributing mechanism of the toxicity (Kurek, K., et al., Plants (Basel), 8(6): 174 (2019). ROS accumulation during seed desiccation or aging is an example of abiotic stress where the seed damage by ROS results in the degradation/deterioration of cellular components such as membrane phospholipids, proteins, and genetic materials (Kumar, S. P. J., et al., Ann. Bot., 116: 663-668 (2015); Ratajczak, E., et al., J. Plant Physiol., 174:147-156 (2015)). Consequently, the oxidative damages in crop seeds cause lowered germination rate and loss of seed viability, leading to significant crop losses.

Contamination of crop seeds by pathogens, especially those resistant to conventional biocides, represents a major biotic stress. Plant defense against pathogens also involves oxidative-stress response. Moreover, outbreaks of commodity-specific food sources, such as maize contamination by hepato-carcinogenic and kidney-damaging mycotoxins produced by fungi, directly affect the health and safety of the public. It has been estimated that fungi cause ~30% of world crop/food losses; Fisher, M. C., et al., Science, 360(6390): 739-742 (2018).

Heat treatment became one of the important strategies for the prevention of pathogen contamination in pre- and post-harvest agricultural or food production (Hansen, J. D., and J. A. Johnson, Int. J. Pest. Manag. 57(4): 267-289 (2011); Dagnas, S., and J. M. Membré, J. Food Prot., 76: 538-551 (2013)). Artificially applied heat negatively affects the growth of pathogenic microbes, thus ensuring the reduction of pathogen contamination or postharvest decay. For instance, high heat treatment (e.g., 70° C.) is one of the postharvest practices to prevent fungal contamination in corn and thereby the production of the hepato-carcinogenic aflatoxins (Hawkins, L. K., et al., J. Food Prot., 68: 1521-1524 (2005)). Thermal treatment (e.g., 70° C.) significantly reduced the infection of aflatoxigenic Aspergillus flavus in maize kernel (Hawkins et al., 2005). However, intensive heat treatment often results in deterioration of the quality of the crops or food products, such as seed integrity/fertility, viability, nutrition values, textures, etc. (Hansen J. D., and J. A. Johnson, 2011; Kim, N. H., et al., J. Appl. Microbiol., 119: 139-148 (2015)). High heat treatment (e.g., steaming, roasting, blanching, etc.) is also a cost-intensive food processing practice (Kim et al., 2015).

Therefore, there is a high demand for the development of new, alternative strategies which warrant early intervention of pathogen/toxin contamination and the quality of harvested crops. Development of resistance of pathogens to thermal treatments is also an increasing public health concern, especially for food safety sectors (Peng, J., et al., Crit. Rev. Food Sci. Nutr., 57: 2970-2995 (2015); Ros-Chumillas, M., et al., J. Food Prot., 78: 2019-2023 (2015)).

Hurdle technology is an approach where combined application of different types of preservation methods at reduced individual intensities could achieve increases in the effectiveness of antimicrobial treatments (Leistner, L., Int. J. Food Microbiol., 55: 181-186 (2000)). Examples of heat-based hurdle technology include: (1) Enhancement of food safety of fresh-cut bell pepper by inactivating Listeria monocytogenes and Salmonella enterica serovar Typhimurium with combined application of slightly acidic electrolyzed water, ultrasound, and mild heat (60° C.) (Luo, K., and D. H. Oh, Food Microbiol., 53(Pt B): 165-171 (2016),)-doi: 10.1016/j.fm.2015.09.014); (2) Inactivation of Escherichia coli O157:H7 on fresh-cut spinach by optimizing low-temperature (45-65° C.) blanching combined with calcium treatment (calcium hydroxide) (Kim et al., 2015); (3) Inactivation of S. enterica serovar Montevideo on mung bean seeds by combined treatment of dry heat (55-70° C.) and chlorine dioxide gas (Annous, B. A., and A. Burke, J. Food Prot., 78: 868-872 (2015)); and (4) Significant decrease in the heat resistance of Clostridium sporogenes by combined treatment of electro-activated solutions and heat (Liato, V., et al., Anaerobe. 35(Pt B): 11-21 (2015)). Often, the co-applied components/measures with heat in these studies were synthetic additives which are not consumer-friendly.

Recently, natural products were included in heat-based hurdle technologies for pathogen control which are considered ecologically benign. For example, augmentation of the antimicrobial potency of $Cu^{2+}$-(+)-catechin (1 mM) by heat during food processing was explored, which resulted in the inhibition of Staphylococcus aureus growth (Holloway, A. C., et al., Lett. Appl. Microbiol., 61: 381-389 (2015)). However, careful selection of natural products adequate to the sensory profile of food products or composition of the food system is highly demanded/necessary for consumer perception (Gutierrez, J., et al., Food Microbiol., 26: 142-150 (2009)).

We found a new utility for long-chain alkyl gallates as heat-sensitizing agents which enables high-efficiency pathogen intervention under decreased temperatures, and seed protection.

SUMMARY OF THE INVENTION

Disclosed are methods of protecting seeds simultaneously from oxidants and microorganisms (e.g., fungi, bacteria) prior to planting the seeds, involving coating the seeds with an antioxidant effective amount and an antimicrobial effective amount of a composition containing at least one compound selected from the group consisting of C$_{7-18}$ gallates in an optional solvent (e.g., aqueous solution, steam vapor) and/or an optional carrier prior to planting the seeds, and subsequently heating the seeds to a temperature of about 20° C. to about 70° C. for about 5 minutes to about 60 minutes prior to planting the seeds.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

DETAILED DESCRIPTION OF THE INVENTION

Figure 1:
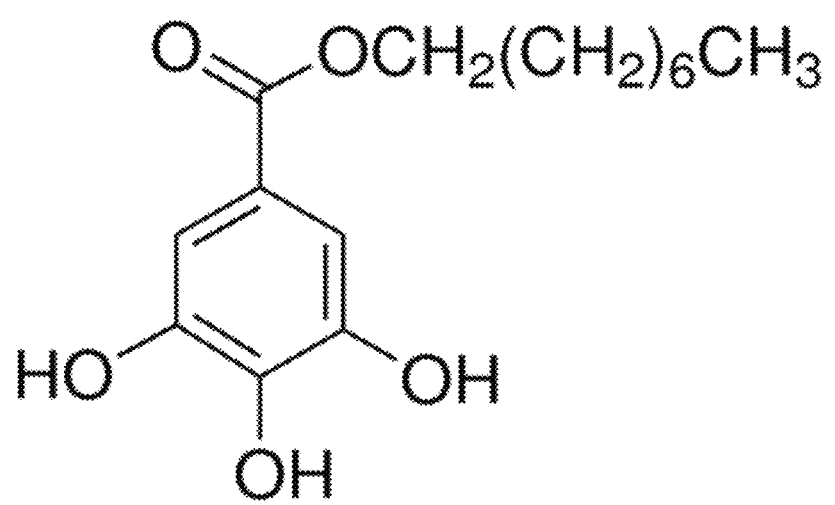
FIG. 1 shows the structure of octyl gallate as described herein.
Figure 2:
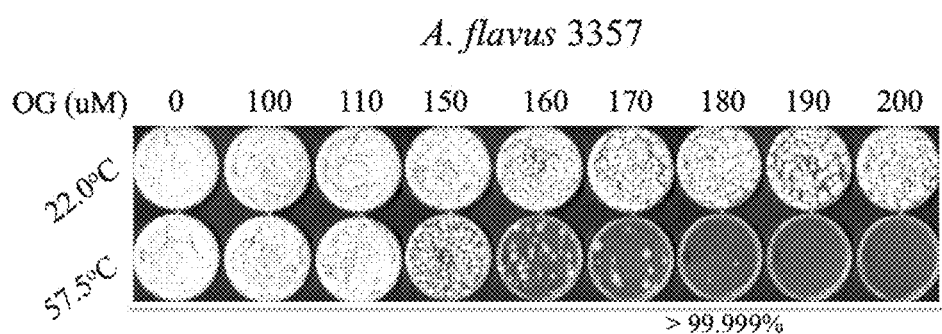
FIG. 2 shows activity of octyl gallate against *Aspergillus flavus* 3357 and *Escherichia coli* JM109 as described herein.
Figure 2:
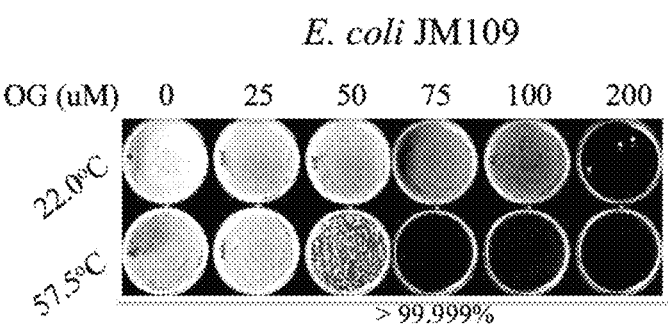
Figure 3:
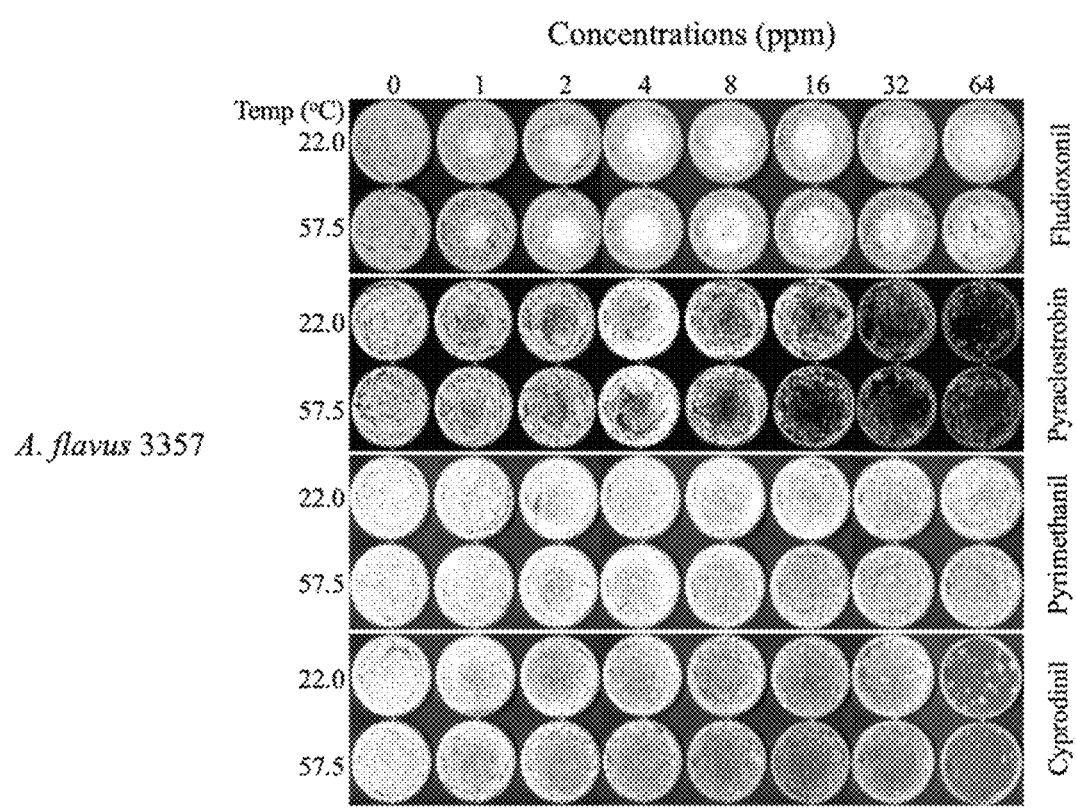
FIG. 3 shows no or limited activity of conventional antimycotic drugs/fungicides against *Aspergillus flavus* 3357 (provided as a comparison to FIG. 2 showing significant heat-sensitizing activity by octyl gallate) as described herein.

Disclosed are methods of protecting seeds from oxidants and microorganisms prior to planting the seeds, involving coating the seeds with an antioxidant effective amount and an antimicrobial effective amount of a composition containing at least one compound selected from the group consisting of C$_{7-18}$ gallates in an optional solvent (e.g., aqueous solution, steam vapor, dimethyl sulfoxide (DMSO)) and/or an optional carrier prior to planting the seeds, and subsequently heating the seeds to a temperature of about 20° C. to about 70° C. (e.g., 20 to 70° C., for example in an aqueous solution), preferably about 30° C. to about 65° C. (e.g., 30° C. to 65° C.), more preferably about 40° C. to about 55° C. (e.g., 40° C. to 55° C.)) for about 5 minutes to about 60 minutes (e.g., 5 to 60 min, for example in an aqueous solution), preferably about 10 min to about 45 min (e.g., 10 to 45 min), more preferably about 15 to about 35 min (e.g., 15 to 35 min) prior to planting the seeds. Generally the coating of the seeds is done about 3 months to about a year before planting the seeds and the subsequent heating of the coated seeds is generally done about 5 minutes to about 60 minutes before planting the seeds.

Other compounds (e.g., conventional antifungal agents known in the art) may be added to the composition containing long chain alkyl gallates provided they do not substantially interfere with the intended activity and efficacy of the composition; whether or not a compound interferes with activity and/or efficacy can be determined, for example, by the procedures utilized below.

"Optional" or "optionally" means that the subsequently described event or circumstance may or may not occur, and that the description includes instances in which said event or circumstance occurs and instances where it does not. For example, the phrase "optionally comprising an antifungal agent known in the art" means that the composition may or may not contain an antifungal agent known in the art and that this description includes compositions that contain and do not contain an antifungal agent known in the art. Also, by example, the phrase "optionally adding an antifungal agent known in the art " means that the method may or may not involve adding an antifungal agent known in the art and that this description includes methods that involve and do not involve adding an antifungal agent known in the art.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

The compounds (i.e., long-chain alkyl gallates) described herein or compositions described herein to be used will be at least an effective amount of the compound or diluted solution of the compound; for fumigation the compounds used may have to be pure form (not mixed or adulterated with any other substance or material). Generally the concentration of the compounds will be, but not limited to, about 0.0015% to about 1% (e.g., 0.0015 to 1%, for example in an aqueous solution), preferably about 0.03% to about 0.3% (e.g., 0.03 to 0.3%), more preferably about 0.06% to about 0.2% (e.g., 0.06 to 0.2%). Generally the concentration of the long chain alkyl gallates will be, but not limited to, about 0.05 mM to about 36 mM (e.g., 0.05 to 36 mM, for example in an aqueous solution), preferably about 1 mM to about 10 mM (e.g., 1 to 10 mM), more preferably about 2 to about 6.7 mM (e.g., 2 to 6.7 mM).

The term "carrier" as used herein includes carrier materials such as those described below. As is known in the art, the vehicle or carrier to be used refers to a substrate such as a mineral oil, paraffin, silicon oil, water, membrane, sachets, disks, rope, vials, tubes, septa, resin, hollow fiber, microcapsule, cigarette filter, gel, fiber, natural and/or synthetic polymers, elastomers or the like. All of these substrates have been used to controlled release effective amount of a composition containing the compounds disclosed herein in general and are well known in the art. Suitable carriers are well-known in the art and are selected in accordance with the ultimate application of interest. Agronomically acceptable substances include aqueous solutions, glycols, alcohols, ketones, esters, hydrocarbons, halogenated hydrocarbons, polyvinyl chloride; in addition, solid carriers such as clays, laminates, cellulosic and rubber matrices and synthetic polymer matrices, or the like.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments and characteristics described herein and/or incorporated herein. In addition, the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount. For example, about 1.0 g means 0.9 g to 1.1 g and all values within that range, whether specifically stated or not.

Unless defined otherwise, all technical and scientific terms used herein have the same meaning as commonly understood by one of ordinary skill in the art to which the invention belongs. The definitions herein described may or may not be used in capitalized as well as singular or plural form herein and are intended to be used as a guide for one of ordinary skill in the art to make and use the invention and are not intended to limit the scope of the claimed invention. Mention of trade names or commercial products herein is solely for the purpose of providing specific information or examples and does not imply recommendation or endorsement of such products. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Figure 4:
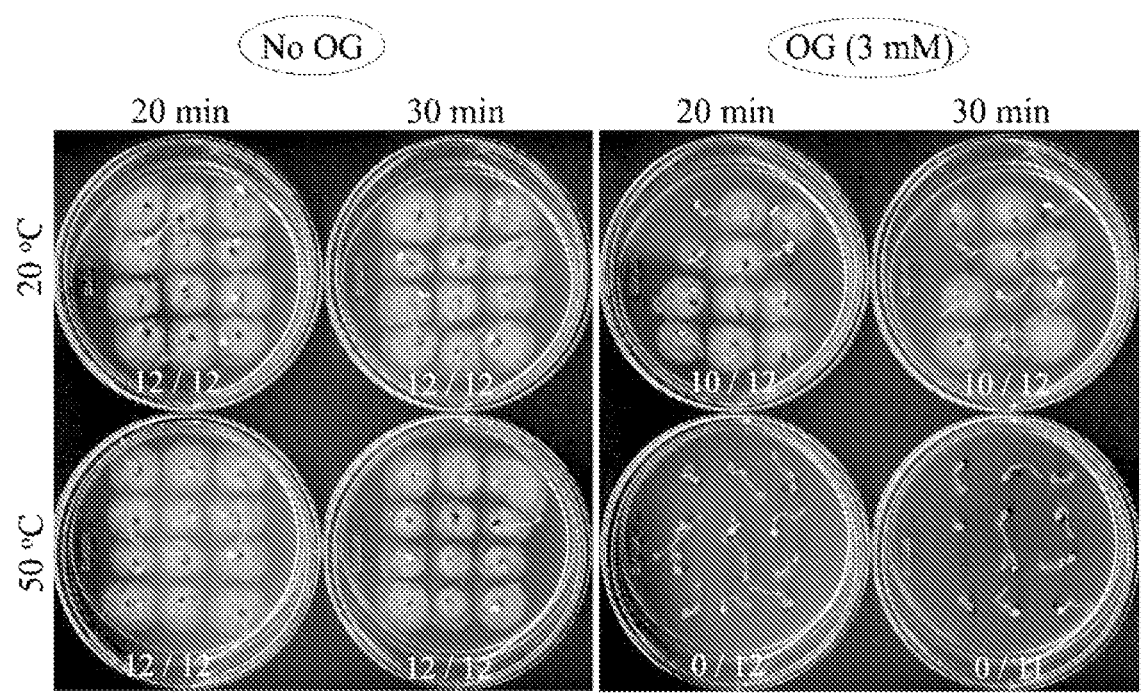
FIG. 4 shows heat sensitization-based antifungal activity of octyl gallate against *Aspergillus flavus* 3357 on *Brassica rapa* Pekinensis seeds as described herein. Numbers presented in each plate (namely, "No./No.") indicate "number of seeds contaminated/numbers of seeds germinated."

In this study, a total of thirty-four compounds/derivatives, currently used as food additives or conventional antifungal agents (included as a comparison), were examined for their heat-sensitizing capability. In a phosphate-buffered saline (PBS)-based compound screening, octyl gallate (OG) showed the highest heat-sensitizing capacity, where co-application of OG (average: 175.8 µM) and mild heat (57.5° C.) for short duration (90 seconds) achieved >99.999% microbial elimination. In a seed sanitation testing, co-application of OG (3 mM) and mild heat (50° C.) for 20 to 30 minutes (Table 5 & FIG. 4) also completely inhibited the growth of the aflatoxin-producing Aspergillus flavus contaminated on crop seeds.

Microorganisms: Microbial strains used in this study are described in Table 1. Aspergillus and Penicillium strains were cultured at 35° C. and 28° C., respectively, on potato dextrose agar (PDA). Escherichia coli and Agrobacterium tumefaciens were grown at 37° C. and 28° C., respectively, on Luria Broth (LB) agar.

Chemicals: Chemicals used in this study were procured from Sigma Co. (St. Louis, Mo.) as follows: (1) phenolic analogs currently used as food additives (benzaldehyde, benzoic acid, carvacrol, cinnamaldehyde, cinnamic acid, 2,4-dihydroxybenzoic acid, 3,4-dihydroxybenzoic acid, guaiacol, 2-hydroxy-4-methoxybenzaldehyde, 2-hydroxy-4-methylbenzaldehyde, methyl benzoic acid, salicylaldehyde, salicylic acid, thymol, vanillin, vanillic acid, vanillylacetone (zingerone)) (U.S. Food and Drug Administration (FDA), Substances Added to Food in the United States, available online https://www.cfsanappsexternal.fda.gov/scripts/fdcc/?set=FoodSubstances); (2) gallate and its alkyl derivatives (short chain: methyl-, ethyl-, propyl-, butyl gallate; long chain: octyl-, nonyl- and decyl gallate); (3) conventional antimycotic drugs/fungicides (caspofungin, cyprodinil, fludioxonil, itraconazole, pyraclostrobin, pyrimethanil); and (4) other food additives/antimicrobial compound (hydrogen peroxide, sodium lauryl sulfate, 2,3-dihydroxybenzaldehyde). Each compound was dissolved in dimethyl sulfoxide (DMSO; absolute DMSO amount: <1% in solution) except hydrogen peroxide which was diluted in distilled water before incorporation into phosphate-buffered saline (PBS). In all tests, control plates (i.e., "No treatment") contained DMSO at levels equivalent to that of cohorts receiving antifungal agents within the same set of experiments.

Antimicrobial bioassay: The heat-sensitizing effect of twenty-eight compounds (phenolic derivatives, alkyl gallates, other food additives) (0.025, 0.050, 0.075, 0.100, 0.200, 0.300, 0.400, 0.500, 0.600 or 0.700 mM) and six drugs/fungicides (1, 2, 4, 8, 16, 32, 64 ppm) (Table 2) were examined using A. flavus 3357. Two hundred µL of fungal spores ($1.5 \times 10^5$ to $2.1 \times 10^5$ CFU) dispersed in PBS was transferred into individual microfuge tube (1.5 mL vol.), where (1) "control" tube contained DMSO only, while (2) "treatment" tube contained test chemical/drug at respective concentration. The tubes were then treated with mild heat (57.5° C.) or maintained at room temperature (RT; 22.0° C.) for 90 seconds. After treatments, entire volume (200 µL) from each microfuge tube was spread onto fresh recovery PDA, and plates were incubated at respective temperatures. Fungal growth/survival was monitored after 48 hrs of incubation.

Then the most potent heat-sensitizing agent, OG, was selected and was examined for further analyses (heat-sensitization) in other microorganisms (Aspergillus, Penicillium, bacteria) (0.05, 0.075, 0.10, 0.11, 0.12, 0.13, 0.14, 0.15, 0.16, 0.17, 0.18, 0.19, 0.20, 0.25, 0.30 mM) (See Tables 3 and 4). As described in A. flavus 3357 test (see above), microfuge tubes were treated with mild heat (57.5° C.) or maintained at RT (22.0° C.) (90 seconds). After heat treatments, entire volume (200 µL) from each microfuge tube was spread onto fresh recovery LB agar (for bacteria) or PDA (for fungi), and plates were incubated at the optimum temperature for respective microorganisms (i.e., 35° C. for Aspergillus, 37° C. for E. coli, 28° C. for Penicillium/A. tumefaciens, respectively). The growth/survival of test microorganisms were monitored after 48 to 72 hrs of incubation.

Antifungal seed disinfection bioassays using OG: Effect of OG plus mild heat hurdle technology on the level of seed sanitation (Brassica rapa Pekinensis; Chinese cabbage hybrid) was evaluated. Twelve cabbage seeds (per treatment), unsterilized, were transferred to each 1.5 mL microcentrifuge tube filled with 1 mL (final volume) distilled water, without or with *A. flavus* (1×10⁵ CFU/mL): (1) No OG, no *A. flavus* inoculum, 20 or 30 min, 20° C.; (2) No OG, no *A. flavus* inoculum, 20 or 30 min, 50° C.; (3) No OG, w/*A. flavus*, 20 or 30 min, 20° C.; (4) No OG, w/*A. flavus*, 20 or 30 min, 50° C.; (5) OG 2 mM, w/*A. flavus*, 20 or 30 min, 20° C., (6) OG 2 mM, w/*A. flavus*, 20 or 30 min, 50° C., (7) OG 3 mM, w/*A. flavus*, 20 or 30 min, 20° C.; (8) OG 3 mM, w/*A. flavus*, 20 or 30 min, 50° C.; (9) OG 4 mM, w/*A. flavus*, 20 or 30 min, 20° C.; and (10) OG 4 mM, w/*A. flavus*, 20 or 30 min, 50° C. After each treatment, the treated seeds (total 12 seeds per treatment) were transferred to PDA and the plates were incubated in the dark at room temperature (RT; 20° C.) for seed germination. After seed germination, the growth of seedlings and fungal germination on the surfaces of germinated seeds were monitored up to 7 days (RT).

Statistical analysis: Statistical analysis (student's t-test) was performed according to "Statistics to use" (Kirkman, T. W., Statistics to Use, available online http://www.physics.csbsju.edu/stats/) where $p<0.05$ was considered significant.

Determination of optimum temperature and time duration for screening heat sensitizers in *A. flavus* 3357: For the determination of the optimum temperature and time points for screening heat sensitizers, fungal (*A. flavus* 3357) survivability was tested by exposing fungal spores (1.5×10⁵ to 2.1×10⁵ CFU) to different temperatures (50, 55, 57.5, 60, 65° C.) and time points (0.5, 1.0, 1.5, 2.0, 2.5, 3.0, 3.5, 4.0, 4.5, 5.0 min). The 90 seconds (1.5 min) treatment with mild heat (57.5° C.) still resulted in the survival/growth of numerous fungal spores (data not shown). Therefore, "57.5° C.+90 sec" setting was chosen as the criteria for screening heat-sensitizing compounds in *A. flavus* 3357.

Selection of long-chain alkyl gallates (octyl-, nonyl-, decyl gallate; OG, NG, DG, respectively) as heat-sensitizing agents: Heat-sensitizing capacity of test compounds (twenty-eight food additives/derivatives and six conventional drugs/fungicides described above) was investigated by determining minimum fungicidal concentration (MFC; where >99.999% fungal death was achieved) of each compound at RT (22.0° C.; control) or with mild heat treatment (57.5° C.) in the aflatoxin-producing *A. flavus* 3357. As shown in Table 2, *A. flavus* 3357 surprisingly maintained the fungal growth (or fungal survival w/less than 99.999% death) at either RT or 57.5° C. with the co-treatment of most compounds tested, i.e., up to 700 μM of phenolic derivatives, short-chain alkyl gallates (gallate, methyl-, ethyl-, propyl-, butyl-gallate), other food additives, or 64 ppm of conventional drugs/fungicides.

On the other hand, when fungi were co-treated with 180, 400 or 200 μM of OG, NG, or DG, respectively, at 57.5° C., surprisingly >99.999% fungal death could be achieved. Therefore, results identified the new utility of long-chain alkyl gallates as potent heat-sensitizing agents, where OG (see FIG. 1 for structure) showed the highest antifungal activity (i.e., the lowest MFC; 180 μM) (FIG. 2), followed by DG (MFC: 200 μM) and NG (MFC: 400 μM). Surprisingly OG alone could also achieve >99.999% fungal death at RT (at 250 μM), while NG or DG did not achieve the same level of fungal death at RT, even with the highest concentration (700 μM) applied (Table 2).

Heat-sensitizing activity of OG against other fungi: Heat-sensitizing activity of OG was then investigated in other fungi (five *Aspergillus* strains and seven *Penicillium* strains) including fungicide resistant strains (i.e., *P. expansum* FR2, FR3 resistant to the conventional fungicide fludioxonil) (see Table 1).

As shown in Table 3, co-application of OG with mild heat (57.5° C.) surprisingly resulted in marked lowering of MFC values of OG in all fungal strains (*Aspergillus* and *Penicillium*) examined. The average MFC of OG determined from twelve fungi was surprisingly decreased from >283.3 μM to 175.8 μM, when temperature was increased from 22.0° C. (RT) to 57.5° C. (mild heat). Therefore, results indicated that OG also surprisingly possesses heat-sensitizing capability against different species of fungal pathogens (surprisingly also against the mutant strains resistant to conventional fungicides).

Heat-sensitizing activity of OG against bacteria (*A. tumefaciens, E. coli*): Heat-sensitizing activity of OG was also investigated against bacterial cells (i.e., *E. coli* and plant-pathogenic *A. tumefaciens*). Surprisingly, as observed in fungi above, co-application of OG with mild heat (57.5° C.) resulted in lowering of the minimum bactericidal concentrations (MBCs) of OG against *A. tumefaciens* or *E. coli* tested. The average MBC of OG was surprisingly lowered from 250 μM to 75 μM, as the temperature shifted from 22.0° C. to 57.5° C. (Table 4; FIG. 2). Therefore, results also indicated that OG surprisingly possesses heat-sensitizing capability against broad-spectrum microbial pathogens (both fungi and bacteria) infecting/contaminating crops and foods.

Indifferent interactions between conventional antifungal drugs/fungicides and mild heat treatment (comparative test): Heat-sensitizing capability of conventional antifungal drugs or fungicides was investigated against *A. flavus* 3357, where the efficacy of drugs/fungicides as heat sensitizers was compared to that of OG. As shown in the FIG. 3 (representative bioassay), co-application of the conventional fungicides (i.e., fludioxonil, pyraclostrobin, cyprodinil, pyrimethanil) or drugs (i.e., caspofungin and itraconazole; figure data not shown), with mild heat (57.5° C.) surprisingly did not result in fungal growth inhibition, even at the highest concentration tested (64 ppm; it is difficult to fully dissolve the conventional antifungal drugs/fungicides above 64 ppm). For example, mild heat (57.5° C.) plus fludioxonil or pyrimethanil (up to 64 ppm; 90 sec) allowed the full growth of pathogens (FIG. 3). Mild heat (57.5° C.) plus itraconazole (cell membrane-interrupting drug, up to 64 ppm; 90 sec), surprisingly resulted in loss of drug activity by heat, thus allowing the survival (even better growth compared to RT (22.0° C.)) of pathogens (figure data not shown). Therefore, it was concluded that six conventional drugs or fungicides tested surprisingly do not possess heat-sensitizing capability.

Seed disinfection via heat-sensitizing activity of OG: Heat-sensitizing capacity of OG was investigated further with crop seeds (*Brassica rapa* Pekinensis; Chinese cabbage hybrid) contaminated with *A. flavus* 3357 on the seed surfaces. OG (0, 2, 3, 4 mM) and mild heat (50° C.; Control: 20° C.) were co-applied for 20 to 30 minutes, and the rates of seed germination were also determined. As shown in Table 5 (see also FIG. 4), surprisingly co-treatment of OG at as low as 3 mM and mild heat (50° C.) for 20 min completely inhibited the growth of *A. flavus,* while the germination rate of the crop seeds was surprisingly not affected when compared to the control.

Discussion: In this study, new utility of long-chain alkyl gallates (e.g., OG, NG, DG) as heat-sensitizing agents was investigated via cell recovery bioassay. Among thirty-four compounds (including six conventional drugs/fungicides for comparison) investigated, surprisingly OG exhibited the highest heat sensitizing capability, followed by DG and NG. This study not only provides means to control broad-spectrum microbial pathogens infecting seeds/crops, but could also enhance the capacity of accepted intervention strategies, such as pasteurization/heat treatment (i.e., hurdle technology). The method provided by this study enhanced heat sensitivity of foodborne pathogens by co-applying selected, ecologically benign compounds (such as OG or OG-based formula (e.g., OG w/antioxidants such as 4-isopropyl-3-methylphenol, surfactants such as alkyl polyglucosides-based C8-16 fatty alcohol, sodium lauryl sulfate-based anionic surface-active agents, etc., at 1 to 20%, and pH buffering agents such as sodium- or potassium bicarbonate (0.01 to 15 molar))), which enables cost-effective control of pathogens by reducing the high energy requirement and time duration of heat treatment.

It is estimated that the size of the seed treatment market will expand from $6.1 billion (USD) (2016) to $11.3 billion by 2022 (Compound Annual Growth Rate: 10.8%), where the high consumer demand for integrated pest management (IPM) practices and sustainable crop production prefers the minimal usage of pesticides, ecologically sound seed treatment products, and beneficial characteristics of the treatment systems such as competence on early-season pathogen management and higher crop yield, etc. (Markets And Markets, Seed Treatment Market, available online https://www.marketsandmarkets.com/Market-Reports/seed-treatment-market-503.html).

OG (and NG, DG with longer alkyl chains) could be used as an ingredient in the seed disinfection formula which can function as alternatives to the conventional seed-disinfecting fungicides. For example, the dimethyldithiocarbamate fungicides Thiram (Thiuram) (the oxidized dimer of dimethyl-dithiocarbamate), Ferbam (iron tris (dimethyldithiocarbamate)), and Ziram (zinc dimethyldithiocarbamate) are contact fungicides that have been used for (1) seed sanitation (cereals, oilseeds, vegetables and feed/forage), (2) foliar treatments on tree fruits (apple, peach and plum), (3) strawberry and celery treatments (plant beds), (4) root dip of sweet potato sprouts, and also as an animal repellent to protect ornamentals and trees (Pest Management Regulatory Agency (PMRA), Canada). However, it has been documented that Thiram and its derivatives trigger serious toxicities to humans, animals and environments (Tilton, F., et al., Toxicol. Appl. Pharmacol., 216: 55-68 (2006); Xu, X., et al., Mol. Pharmacol., 92: 358-365 (2017); Cao, F., et al., Chemosphere, 214: 303-313 (2019)). Thiram causes cellular oxidative stress in fungi, where the cellular antioxidant molecule glutathione (GSH) may be involved in GSH S-transferases-independent chemical reaction with Thiram to form GSH S-conjugates in fungal cells (Kitagawa, E., et al., Environ. Sci. Technol., 36: 3908-3915 (2002); Pócsi, I., et al., Adv. Microb. Physiol., 49: 1-76 (2004)). Therefore, in 2018, Health Canada's Pest Management Regulatory Agency (PMRA) released its final re-evaluation decision for the continued use of the fungicides Ferbam, Thiram, and Ziram. The evaluated risks were unacceptable for both Ferbam and Ziram, hence the agency will cancel the registration of these two products in Canada; the phase-out timeline for Ferbam and Ziram is 3-years from Dec. 14, 2018. For Thiram, certain uses of this compound will be cancelled, which include: (1) All foliar uses on tree fruits such as apple, peach, plum, strawberry, celery, and sweet potato (sprout root dip); (2) All seed treatments of grasses, dry onion bulb, and alfalfa grown for forage; (3) All commercial seed treatment of wheat, barley, oats, canola, mustard, rapeseed, rye, triticale, and corn; and (4) Importation into Canada of seeds treated with Thiram will not be permitted (PMRA).

The azole fungicides are another example. Azoles are used as antifungal agents for the treatment of both clinical and agricultural fungal pathogens, including those contaminating crop seeds. The triazole class of fungicides inhibit lanosterol 14 alpha-demethylases (cytochrome P450 (CYP) enzymes), triggering the disruption of cell membrane biosynthesis in fungal pathogens (Groll, A. H., et al., Advances in Pharmacology, 44: 343-500 (1998)). Since the detection of the first azole-resistant isolate of the human pathogen *Aspergillus fumigatus* (Denning, D. W., et al., Antimicrobial Agents and Chemotherapy, 41: 1364-1368 (1997)), resistance in other *Aspergillus* species such as mycotoxin-producing *A. flavus* and *Aspergillus paraciticus* have been found worldwide (Chowdhary, A., et al., PLoS One. 7: e52871 (2012); Rivero-Menendez, O., et al., Journal of Fungi, 2: 21 (2016)). It has been postulated that long-term application of azole fungicides to fields could provide selection pressure for the emergence of pan-azole-resistant strains (Doukas, E. G., et al., Fungal Genetics and Biology, 49: 792-801 (2012); Sharma, C., et al., Journal of Global Antimicrobial Resistance, 3: 69-74 (2015); Tangwattanachuleeporn, M., et al., Medical Mycology, 55: 429-435 (2017); Riat, A., et al., Antimicrobial Agents and Chemotherapy, 62: pii: e02088-17 (2018); Cui, N., et al., Science of the Total Environment, 648: 1237-1243 (2019); Prigitano, A., et al., Journal of Global Antimicrobial Resistance, 16: 20-224 (2019); Rudramurthy, S. M., et al., Journal of Fungi, 5: 55 (2019)). Recently, the correlation between enhanced mycotoxin production and azole resistance has also been well documented (Han, S. H. et al., J. Agric. Food Chem., 68:5309-5317 (2020); Popiel, D. et al., Eur. J. Plant Pathol., 147:773-785 (2017); Bowyer, P., and D. W. Denning, Pest Management Science, 70: 173-178 (2014)). Therefore, research is urgently needed to determine the prevalence of azole-resistant aspergilli, their associated resistance mechanisms, as well as the development of control measures to reduce/eliminate these fungi in agricultural environments.

In summary, this study provides novel advantages over conventional antimicrobial practices, possibly establishing new "hurdle technology", which will also alleviate side effects associated with current antimicrobial intervention methods.

All of the references cited herein, including U.S. Patents and U.S. Patent Application Publications, are incorporated by reference in their entirety, including the following: Jacob, C., Molecules, 19: 19588-19593 (2014); Jacob, C., Natural Product Reports, 23: 851-863 (2006); Kim, J. H. et al., Antifungal activity of redox-active benzaldehydes that target cellular antioxidation, Ann. Clin. Microbiol. Antimicrob. (2011); Kim, J. H. et al., Molecules, 18: 1564-1581 (2013); Macedo, W. R., et al., Nat Prod Res., 32: 2692-2696 (2018); Kim, J. H. et al., FEMS Microbiol Lett., 270(2): 284-290 (2007; Macedo, W. R., et al., Nat Prod Res., 32: 2692-2696 (2018)).

Thus, in view of the above, there is described (in part) the following:

A method of protecting seeds (simultaneously) from oxidants and microorganisms prior to planting said seeds, said process comprising (or consisting essentially of or consisting of) coating said seeds with an antioxidant effective amount and an antimicrobial effective amount of a composition comprising (or consisting essentially of or consisting of) at least one compound selected from the group consisting of $C_{7-18}$ gallates in an optional solvent and/or optional carrier prior to planting said seeds, and heating said seeds to a temperature of about 20° C. to about 70° C. for a time of about 5 minutes to about 60 minutes prior to planting said seeds.

The above method, wherein said composition comprises at least one compound selected from the group consisting of octyl gallate, nonyl gallate, decyl gallate, and mixtures thereof. The above method, wherein said composition comprises octyl gallate. The above method, wherein said temperature is about 30° C. to about 65° C. The above method, wherein said temperature is about 40° C. to about 55° C.

The above method, wherein said time is about 10 min to about 45 min.

The above method, wherein said time is about 15 min to about 35 min.

The term "consisting essentially of" excludes additional method steps or composition components that substantially interfere with the intended activity of the methods or compositions of the invention and can be readily determined by those skilled in the art (e.g., from a consideration of this specification or practice of the invention disclosed herein). This term may be substituted for inclusive terms such as "comprising" or "including" to more narrowly define any of the disclosed embodiments or combinations/sub-combinations thereof. Furthermore, the exclusive term "consisting" is also understood to be substitutable for these inclusive terms in alternative forms of the disclosed embodiments.

The invention illustratively disclosed herein suitably may be practiced in the absence of any element (e.g., method (or process) steps or composition components) which is not specifically disclosed herein. Thus, the specification includes disclosure by silence ("Negative Limitations In Patent Claims," AIPLA Quarterly Journal, Tom Brody, 41(1): 46-47 (2013): ". . . Written support for a negative limitation may also be argued through the absence of the excluded element in the specification, known as disclosure by silence . . . Silence in the specification may be used to establish written description support for a negative limitation. As an example, in Ex parte fin [No. 2009-0486, at 2, 6 (B.P.A.I. May 7, 2009)] the negative limitation was added by amendment . . . In other words, the inventor argued an example that passively complied with the requirements of the negative limitation . . . was sufficient to provide support . . . This case shows that written description support for a negative limitation can be found by one or more disclosures of an embodiment that obeys what is required by the negative limitation . . . ."

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims. Although any methods and materials similar or equivalent to those described herein can be used in the practice or testing of the present invention, the preferred methods and materials are herein described. Those skilled in the art may recognize other equivalents to the specific embodiments described herein which equivalents are intended to be encompassed by the claims attached hereto.

TABLE 1

Microbial strains (fungi, bacteria) tested in this study.

| | Characteristics | Source/References |
|---|---|---|
| *Aspergillus* | | |
| *A. flavus* 3357 | Plant pathogen (aflatoxin), Human pathogen (aspergillosis), Reference aflatoxigenic strain used for genome sequencing | NRRL[a] |
| *A. flavus* 4212 | Plant pathogen (aflatoxin), Human pathogen (aspergillosis) | NRRL |
| *A. parasiticus* 5862 | Plant pathogen (aflatoxin) | NRRL |
| *A. parasiticus* 2999 | Plant pathogen (aflatoxin) | NRRL |
| *A. brasiliensis* 16404 | Environmental strain | ATCC[b] |
| *Penicillium* | | |
| *P. expansum* W1 | Plant pathogen (patulin), Parental strain | Li et al., 2008[c] |
| *P. expansum* FR2 | Plant pathogen (patulin), Fludioxonil resistant mutant derived from *P. expansum* W1 | Li et al., 2008 |
| *P. expansum* W2 | Plant pathogen (patulin), Parental strain | Li et al., 2008 |
| *P. expansum* FR3 | Plant pathogen (patulin), Fludioxonil resistant mutant derived from *P. expansum* W2 | Li et al., 2008 |
| *P. italicum* 983 | Plant pathogen | NRRL |
| *P. griseofulvum* 2159 | Plant pathogen | NRRL |
| *P. chrysogenum* 824 | Plant pathogen | NRRL |
| Bacteria | | |
| *Escherichia coli* JM109 | Model bacterium | Laboratory strain |
| *Agrobacterium tumefaciens* LBA4404 | Plant pathogen | Laboratory strain |

[a]NRRL, National Center for Agricultural Utilization and Research, USDA-ARS, Peoria, IL, USA.
[b]ATCC, American Type Culture Collection, Manassas, VA, USA.
[c]Li HX and Xiao CL. 2008. Characterization of fludioxonil-resistant and pyrimethanil-resistant phenotypes of *Penicillium expansum* from apple. Phytopathology 98:427-435.

TABLE 2

Selection of long-chain alkyl gallates (OG, NG, DG) as heat-sensitizing agents against *A. flavus* (Determination of >99.999% fungal death with mild heat co-treatment). Note that OG possesses the highest antifungal activity.

| Compounds | Temperature 22.0° C. | 57.5° C. |
|---|---|---|
| Phenolic derivatives (µM): | | |
| Benzaldehyde | >700 | >700 |
| Benzoic acid | >700 | >700 |
| Carvacrol | >700 | >700 |
| Cinnamaldehyde | >700 | >700 |
| Cinnamic acid | >700 | >700 |
| 2,4-Dihydroxybenzoic acid | >700 | >700 |
| 3,4-Dihydroxybenzoic acid | >700 | >700 |
| Guaiacol | >700 | >700 |
| 2-Hydroxy-4-methoxybenzaldehyde | >700 | >700 |
| 2-Hydroxy-4-methylbenzaldehyde | >700 | >700 |
| Methyl benzoic acid | >700 | >700 |
| Salicylaldehyde | >700 | >700 |
| Salicyllic acid | >700 | >700 |
| Thymol | >700 | >700 |
| Vanillin | >700 | >700 |
| Vanillic acid | >700 | >700 |
| Vanillylacetone | >700 | >700 |
| Alkyl gallates (µM): | | |
| Gallate | >700 | >700 |
| Methyl gallate | >700 | >700 |
| Ethyl gallate | >700 | >700 |
| Propyl gallate | >700 | >700 |
| Butyl gallate | >700 | >700 |
| Octyl gallate | 250 | 180* |
| Nonyl gallate | >700 | 400* |
| Decyl gallate | >700 | 200* |
| Antimycotic drugs/fungicides (µg/mL; ppm): | | |
| Caspofungin | >64 | >64 |
| Cyprodinil | >64 | >64 |
| Fludioxonil | >64 | >64 |
| Itraconazole | 64 | >64 |
| Pyraclostrobin | >64 | >64 |
| Pyrimethanil | >64 | >64 |
| Other food additives (µM): | | |
| Hydrogen peroxide | >700 | >700 |
| Sodium lauryl sulfate | >700 | >700 |
| 2,3-Dihydroxybenzaldehyde | >700 | >700 |

*$P < 0.05$ for long-chain alkyl gallates.

TABLE 3

Heat-sensitizing capability of OG in different fungi.

| Treatment Fungi | OG (µM), 22.0° C. | OG (µM), 57.5° C. |
|---|---|---|
| *A. flavus* 3357 | 250 | 180 |
| *A. flavus* 4212 | >300 | 180 |
| *A. parasiticus* 2999 | >300 | 200 |
| *A. parasiticus* 5862 | >300 | 300 |
| *A. brasiliensis* 16404 | >300 | 160 |
| *P. expansum* W1 | >300 | 160 |
| *P. expansum* FR2 | >300 | 190 |
| *P. expansum* W2 | >300 | 170 |
| *P. expansum* FR3 | >300 | 160 |
| *P. italicum* 983 | 200 | 100 |
| *P. griseofulvum* 2159 | >300 | 180 |
| *P. chrysogenum* 824 | 250 | 130 |
| Average | >283.3 | 175.8 ($p < 0.005$) |

TABLE 4

Heat-sensitizing capability of OG in bacteria.

| Treatment Bacteria | OG (µM), 22° C. | OG (µM), 57.5° C. |
|---|---|---|
| *E. coli* JM109 | 300 | 75 |
| *A. tumefaciens* 4212 | 200 | 75 |
| Average | 250 | 75* |

*The t-test was not performed (Duplicated samples).

TABLE 5

Effect of OG plus mild heat treatment (hurdle technology) on sanitation of cabbage seeds inoculated with *A. flavus* 3357.

| OG (mM) | Temp. (° C.) | Time (Minutes) | No. of seedlings germinated | No. of seedlings infected | No. of seedlings naturally contaminated[c] |
|---|---|---|---|---|---|
| 0 (w/o *A. flavus*) | 20 | 20 | 12 | 0 | 1 |
| | | 30 | 12 | 0 | 0 |
| | 50 | 20 | 12 | 0 | 0 |
| | | 30 | 12 | 0 | 2 |
| % Seed germination | | | 100 ± 0 | — | |
| % *A. flavus* infection | | | — | N/A | |
| 0 | 20 | 20 | 12 | 12 | 0 |
| | | 30 | 12 | 12 | 0 |
| | 50 | 20 | 12 | 12 | 0 |
| | | 30 | 12 | 12 | 1 |
| % Seed germination | | | 100 ± 0 | — | |
| % *A. flavus* infection | | | — | 100 ± 0 | |
| 2 | 20 | 20 | 12 | 12 | 0 |
| | | 30 | 12 | 10 | 1 |

TABLE 5-continued

Effect of OG plus mild heat treatment (hurdle technology) on sanitation of cabbage seeds inoculated with *A. flavus* 3357.

| OG (mM) | Temp. (° C.) | Time (Minutes) | No. of seedlings germinated | No. of seedlings infected | No. of seedlings naturally contaminated[c] |
|---|---|---|---|---|---|
| | 50 | 20 | 12 | 4 | 0 |
| | | 30 | 10 | 1 | 0 |
| % Seed germination | | | 96 ± 8 ([a]P = 0.356) | — | |
| % *A. flavus* infection | | | — | 57 ± 43 ([b]P = 0.086) | |
| 3 | 20 | 20 | 12 | 10 | 0 |
| | | 30 | 12 | 10 | 0 |
| | 50 | 20 | 12 | 0[d] | 0 |
| | | 30 | 11 | 0[d] | 0 |
| % Seed germination | | | 98 ± 4 ([a]P = 0.356) | — | |
| % *A. flavus* infection | | | — | 42 ± 48 ([b]P = 0.052) | |
| 4 | 20 | 20 | 12 | 12 | 0 |
| | | 30 | 12 | 11 | 0 |
| | 50 | 20 | 11 | 0[d] | 0 |
| | | 30 | 11 | 0[d] | 0 |
| % Seed germination | | | 96 ± 5 ([a]P =0.134) | — | |
| % *A. flavus* infection | | | — | 48 ± 56 ([b]P = 0.109) | |

[a]Student's t-test for paired data (i.e., % seed germination under OG treatment) was vs. mean % seed germination without OG treatment.
[b]Student's t-test for paired data (i.e., % *A. flavus* infection under OG treatment) was vs. mean % *A. flavus* infection without OG treatment.
[c]Number of seedlings with natural contamination identified (before *A. flavus* inoculation).
[d]Denotes 100% *A. flavus* death.

I claim:

1. A method of protecting seeds from oxidants and microorganisms prior to planting said seeds, said process comprising coating said seeds with an antioxidant effective amount and an antimicrobial effective amount of a composition comprising octyl gallate, nonyl gallate, or decyl gallate in an optional solvent and/or optional carrier prior to planting said seeds, and heating said seeds to a temperature of about 20° C. to about 70° C. when coating with octyl gallate or heating said seeds to a temperature of about 50° C. to about 70° C. when coating with nonyl gallate or decyl gallate for a time of about 5 minutes to about 60 minutes prior to planting said seeds.

2. The method according to claim 1, wherein said composition comprises octyl gallate.

3. The method according to claim 1, wherein said temperature is about 30° C. to about 65° C. when coating with octyl gallate.

4. The method according to claim 1, wherein said temperature is about 40° C. to about 55° C. when coating with octyl gallate.

5. The method according to claim 1, wherein said time is about 10 minutes to about 45 minutes.

6. The method according to claim 1, wherein said time is about 15 minutes to about 35 minutes.

* * * * *